(12) United States Patent
MacKenzie

(10) Patent No.: US 8,289,443 B2
(45) Date of Patent: Oct. 16, 2012

(54) MOUNTING AND BRACKET FOR AN ACTOR-MOUNTED MOTION CAPTURE CAMERA SYSTEM

(75) Inventor: Michael MacKenzie, Corte Madera, CA (US)

(73) Assignee: Two Pic MC LLC, Burbank, CA (US)

( * ) Notice: Subject to any disclaimer, the term of this patent is extended or adjusted under 35 U.S.C. 154(b) by 715 days.

(21) Appl. No.: 12/240,911

(22) Filed: Sep. 29, 2008

(65) Prior Publication Data

US 2010/0079664 A1   Apr. 1, 2010

(51) Int. Cl.
*H04N 5/225* (2006.01)
(52) U.S. Cl. .......................... 348/376; 348/373; 348/375
(58) Field of Classification Search .................. None
See application file for complete search history.

(56) References Cited

U.S. PATENT DOCUMENTS

| | | | |
|---|---|---|---|
| 4,797,736 A | 1/1989 | Kloots et al. | |
| 6,020,892 A | 2/2000 | Dillon | |
| 6,121,953 A | 9/2000 | Walker | |
| 6,578,967 B1 | 6/2003 | Paddock et al. | |
| 7,218,320 B2 | 5/2007 | Gordon et al. | |
| 7,333,113 B2 | 2/2008 | Gordon | |
| 7,358,972 B2 | 4/2008 | Gordon et al. | |
| 7,388,971 B2 | 6/2008 | Rice et al. | |
| 7,401,920 B1 | 7/2008 | Kranz et al. | |
| 2005/0105772 A1 | 5/2005 | Voronka et al. | |
| 2006/0071934 A1 | 4/2006 | Sagar et al. | |
| 2006/0146142 A1 | 7/2006 | Arisawa et al. | |
| 2006/0218703 A1* | 10/2006 | Prendergast et al. | ............. 2/422 |
| 2007/0047768 A1 | 3/2007 | Gordon et al. | |
| 2007/0058839 A1 | 3/2007 | Echegaray et al. | |
| 2007/0214551 A1 | 9/2007 | Teetzel et al. | |
| 2008/0025569 A1 | 1/2008 | Gordon et al. | |

OTHER PUBLICATIONS

International Search Report dated Dec. 2, 2009 for International Application No. PCT/US09/58848, filed Sep. 29, 2009.
International Search Report dated Nov. 20, 2009 for International Application No. PCT/US09/58820, filed Sep. 29, 2009.
International Search Report dated Nov. 20, 2009 for International Application No. PCT/US09/58824, filed Sep. 29, 2009.

* cited by examiner

*Primary Examiner* — James Hannett
*Assistant Examiner* — Angel L Garces-Rivera
(74) *Attorney, Agent, or Firm* — Kilpatrick Townsend & Stockton LLP

(57) ABSTRACT

The present invention relates to computer capture of object motion. More specifically, embodiments of the present invention relate to capturing of facial movement or performance of an actor. Embodiments of the present invention provide a mounting bracket for a head-mounted motion capture camera system. In many embodiments, the mounting bracket includes a helmet that is positioned on the actor's head and mounting rods on either side of the helmet that project toward the front of the actor that may be flexibly repositioned. Cameras positioned on the mounting rods capture images of the actor's face.

14 Claims, 9 Drawing Sheets

MOUNTING AND BRACKET FOR AN ACTOR-MOUNTED MOTION CAPTURE CAMERA SYSTEM

CROSS-REFERENCES TO RELATED APPLICATIONS

The present invention is related to U.S. application Ser. No. 12/240,907, filed Sep. 29, 2008, entitled "ACTOR-MOUNTED MOTION CAPTURE CAMERA" and to U.S. application Ser. No. 12/240,928, filed Sep. 29, 2008, entitled "ASYNCHRONOUS STREAMING OF DATA FOR VALIDATION". These applications are incorporated by reference, for all purposes.

BACKGROUND OF THE INVENTION

The present invention relates to computer capture of object motion. More specifically, embodiments of the present invention relate to capturing of facial movement or performance of an actor.

Traditional computer animation of objects is determined by users known as animators. These animators are skilled artists who would specify movement of objects, such as people, within a computer environment. As a model for human movement, many animators often referred to how they moved, through the use of mirrors, video cameras, or the like.

Animation has also been based more directly upon physical movement of actors. This animation is known in the film industry as motion-capture or performance capture. In such cases, an actor is equipped with a suit with a number of markers, and as the actor moves, a number of cameras track the positions of the markers in space. This technique allows the actor's movements and expressions to be captured, and the movements and expressions can then be manipulated in a digital environment to produce whatever animation is desired.

One difficulty with prior motion capture techniques is that they often fail to produce high quality results with respect to capturing facial motion. Facial motion is very detailed and capturing the fine movements of an actor, or failing to do so, has a significant impact on the end product. Simply scaling current techniques to capture more markers is not practical as the data management, storage and processing capabilities are barely able to handle current marker density. High fidelity motion-capture, particularly video based data of the face, generates large volumes of digital data. Further, the fine-grain motion of the face is often lost in the noise inherent in stationary camera motion capture systems.

One solution to this problem has been to use separate and non-simultaneous face and body motion capture. A drawback to this approach is that it requires substantial duplication of effort by the actor and the crew, as each scene must be performed and captured at least twice. Another difficulty arises in that the actor's second performance may not correspond closely enough with the first, which affects the appearance and quality of the end result by making the correlation of the data from the multiple performances difficult.

Another solution is a simultaneous face and body motion capture using fixed position cameras and/or movable platform mounted cameras 100, such as is shown in FIG. 1. Capturing detailed facial motion generally involves tracking a large number of markers 140 placed on the actors' faces throughout a fixed capture volume 120, which is defined by the stationary motion capture cameras. In addition to the facial markers 140, markers 130 are placed on the actors' bodies, averaging a total of about 250 marker points per actor. For a scene with several actors, the total number of markers may be well over a thousand.

This abundance of markers creates a correspondingly large amount of data to be processed. It is sometimes difficult to accurately identify the markers associated with each actor 110 in a scene and obtaining sufficient resolution of the closely spaced facial markers 140 presents further complexities. In addition, because data from both the face and the body is captured together, it is necessary to process all of the data in order to determine whether sufficient facial motion data was recorded. Similarly, feedback cannot be given to the director or actor regarding the overall movement in the scene until all of the data has been processed. Waiting for the combined facial and body data to be processed significantly increases the delay between the initial capture and any reshoots that are necessary, likely causing production and scheduling problems, as well as increasing costs.

Prior head-mounted cameras have had several obstacles, such as interfering with the performance of the actor, either due to the discomfort of wearing the device or from the mere presence of the device in front of the actor's eyes or mouth, or failing to capture images of an adequate portion of the face for quality reconstruction. In addition, prior head-mounted cameras experience difficulty in maintaining position or in repositioning the camera.

Accordingly, an improved system for capturing and processing facial motions of an actor that increases accuracy while minimizing processing time and difficulty is desired. In addition, it would be desirable to have a head-mounted camera that is unobtrusive to the actor, but is capable of imaging a substantial portion of the face, and is easily repositioned.

BRIEF SUMMARY OF THE INVENTION

The present invention relates to computer capture of object motion. More specifically, embodiments of the present invention relate to capturing of facial movement or performance of an actor. Embodiments of the present invention provide a mounting bracket for a head-mounted motion capture camera system. In many embodiments, the mounting bracket includes a helmet that is positioned on the actor's head and mounting rods on either side of the helmet that project toward the front of the actor that may be flexibly repositioned. Cameras positioned on the mounting rods capture images of the actor's face.

In a first aspect, embodiments of the present invention provide a mounting bracket for a head-mounted motion capture camera system for capturing motion of an actor's face. A helmet is adapted to be positioned on the head of an actor. At least one mounting rod is attached to the helmet, where each mounting rod has at least one camera mounted on the rod.

In some embodiments, the mounting rods are attached to the helmet with universal joints. Each universal joint may be fixed in position such that the orientation of the mounting rod with respect to the helmet does not change. Each universal joint is configured such that the mounting rod may be removed and replaced at the same orientation with respect to the helmet.

In some embodiments, the mounting rods have at least three degrees of freedom of movement. The mounting rods generally extend toward the front of the helmet.

In some embodiments, the cameras are attached to the mounting rods with universally pivoting ball joints. Each universally pivoting ball joint may be fixed in position such that the angle of the camera with respect to the mounting rod does not change. Each universally pivoting ball joint is configured such that the camera may be removed and replaced at the same angle with respect to the mounting rod.

In some embodiments, the cameras are configured to capture images of the actor's face. In many embodiments, there are at least two cameras, and the cameras are configured to capture images of the actor's face from at least two angles.

In some embodiments, the mounting bracket includes two mounting rods attached to the helmet. In many embodiments, the two mounting rods are attached on opposite sides of the helmet. In some preferred embodiments, each mounting rod has two cameras mounted on the rod.

In another aspect, embodiments of the present invention provide a mounting bracket for a head-mounted camera system comprising. A helmet is adapted to be positioned on the head of an actor, with two mounting rods attached to either side of the helmet. The mounting rods are connected to the helmet by a universal joint and a plurality of cameras are positioned on the mounting rods.

In some embodiments, the plurality of cameras includes at least one camera-positioned on each mounting rod. The plurality of cameras are attached to the mounting rods with universally pivoting ball joints.

DETAILED DESCRIPTION OF THE INVENTION

Embodiments of the present invention relate to computer capture of object motion. Although embodiments make specific reference to capturing of facial movement or performance of an actor, the system methods and device described herein may be applicable to any application in which computer capture of fine movements is required.

Figure 2:
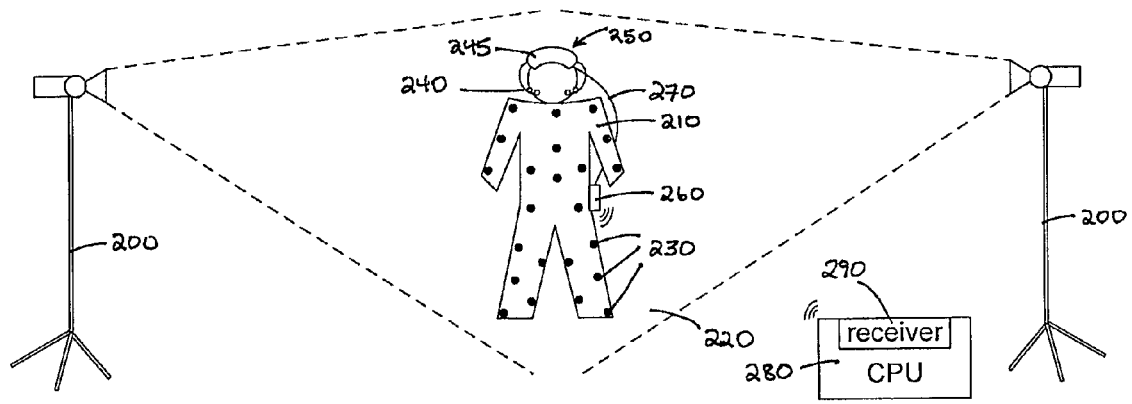
FIG. 2 shows a motion capture camera system according to an embodiment of the present invention.

FIG. 2 shows a motion capture camera system according to an embodiment of the present invention. A head-mounted motion capture camera system 250 is positioned on the actor's head for capturing data from the facial movement of the actor 210. The head-mounted camera system includes cameras 240 and a helmet 245. The cameras 240 are connected via cable 270 to a data logger 260, which is attached to the actor. The data logger 260 may be worn on a belt or otherwise as part of the actor's clothing to prevent the data logger from becoming disconnected during the actor's performance. The data logger 260 is in wireless communication with a processor 280 via a wireless receiver 290.

Figure 1:
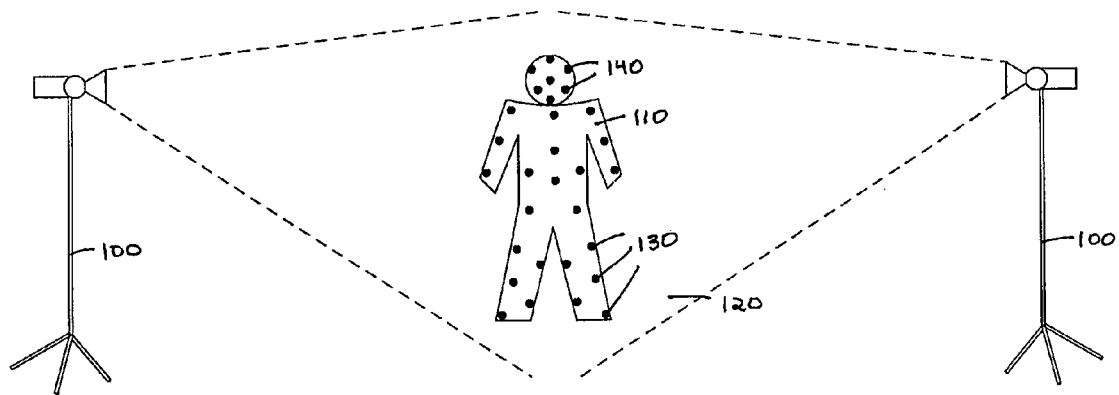
FIG. 1 depicts a prior art motion capture camera system.

For capturing the data from the body movement of an actor 210, the system in FIG. 2 is similar to that shown in FIG. 1. Fixed or platform-mounted movable cameras 200 are positioned around an actor 210, defining a capture volume 220. The cameras 200 capture images of the actor's movement using body markers 230.

Figure 3:
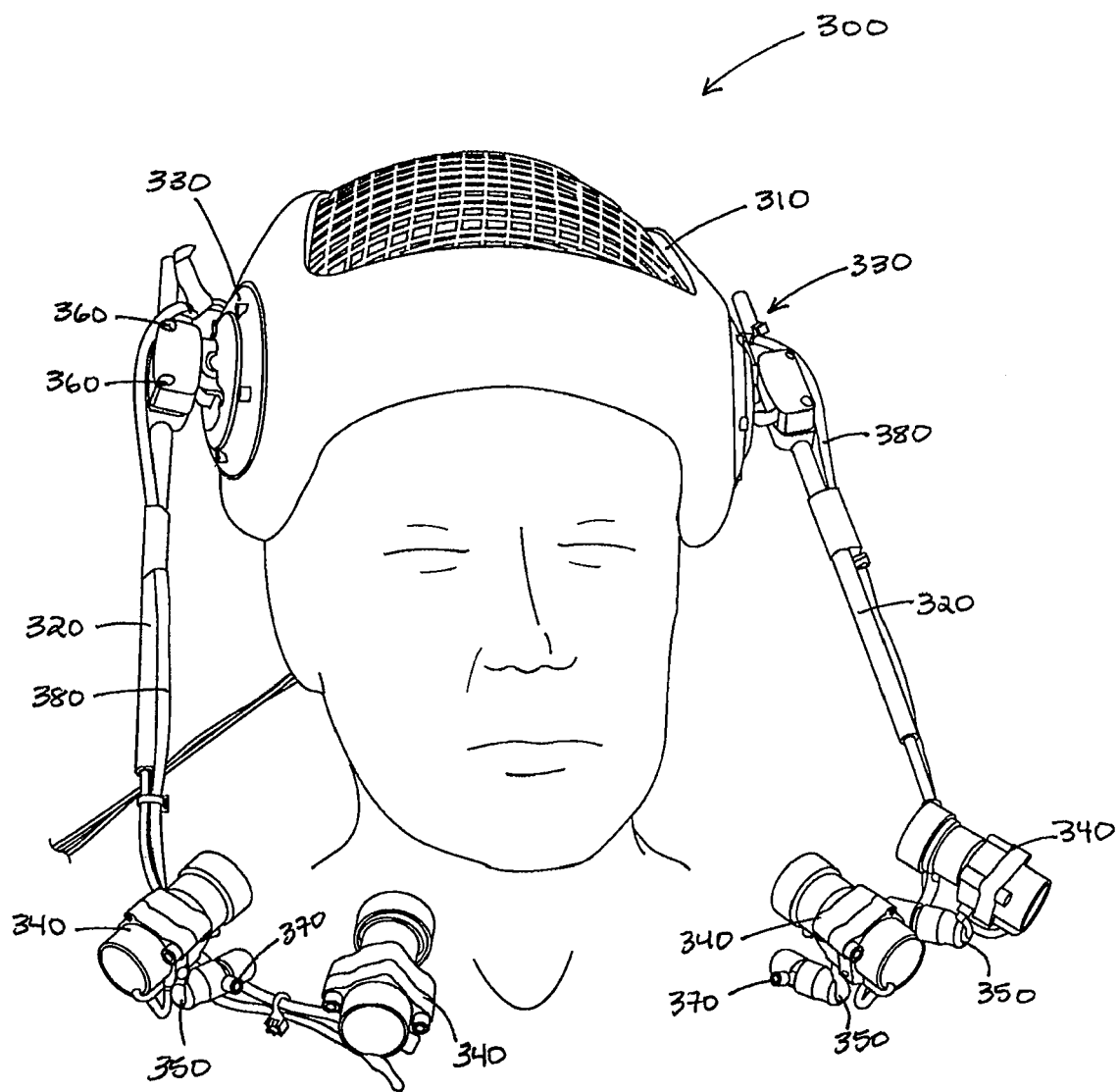
FIG. 3 shows a head-mounted camera system according to an embodiment of the present invention.

FIG. 3 shows one embodiment of a head-mounted motion capture camera system 300 in more detail. A helmet 310 is secured to the head of an actor. Mounting rods 320 are attached to the helmet 310 via universal joints 330. In some embodiments, the mounting rods 320 will be attached to the helmet 310 approximately above the temples of the actor. Mounted on the mounting rods 320 are cameras 340. The cameras 340 are secured to the mounting rods 320 with universally pivoting ball joints 350. The mounting rods 320 are preferably made from carbon fiber tubes and/or stainless steel to minimize weight, while maintaining the strength of the rods. Adjustment screws 360 and 370 are provided to adjust the orientation of the mounting rod 320 and cameras 340, respectively. The cameras 340 are connected via cables 380 to the data logger (not shown).

Figure 4:
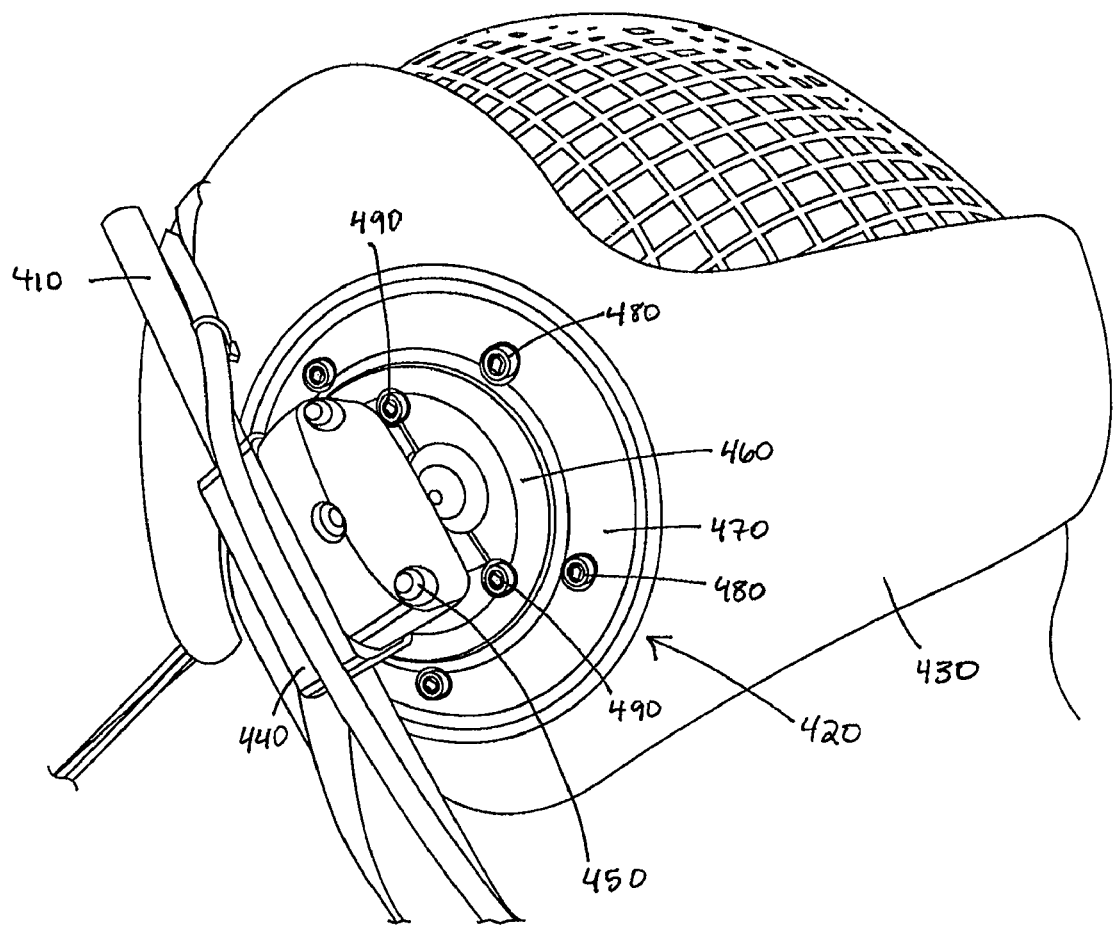
FIG. 4 depicts an enlarged view of a universal joint connecting a mounting rod and helmet.

In FIG. 4, an enlarged side view of an embodiment of a head-mounted motion capture camera system is shown. Mounting rod 410 is connected via a universal joint 420 to helmet 430. The universal joint includes a bracket 440, which holds the mounting rod 410 in a channel extending lengthwise through the bracket. Set screws 450 maintain pressure on the mounting rod 410 to hold it in position within the bracket 440. The bracket 440 is connected to an inner circular portion 460 of the universal joint 420. The inner circular portion 460 is positioned concentrically inside an outer circular portion 470. Outer circular portion 470 is affixed to the helmet 430 using screws 480. The outer circular portion 470 does not move with respect to the helmet and is preferably configured to affix to the helmet 430 in a singular orientation. Inner circular portion 460 is rotatable with respect to the outer circular portion 470, allowing one degree of freedom of movement for the mounting rod, such that its orientation may be adjusted to position the cameras (not shown) higher or lower in front of the actor's face. Set screws 490 are used to lock the inner circular portion 460 into a fixed position with respect to the outer circular portion 470.

Figure 5:
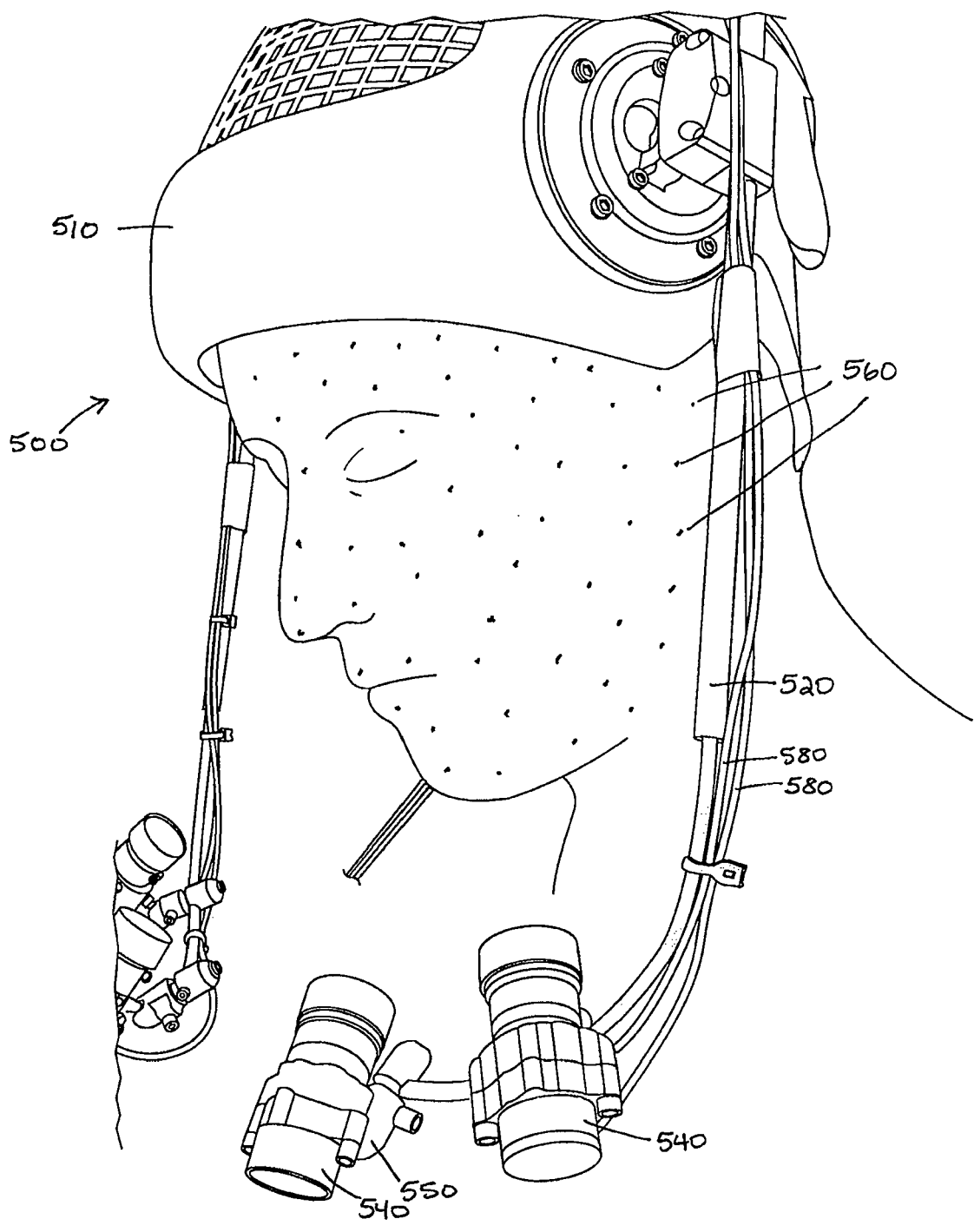
FIG. 5 shows a side view of an embodiment of a head-mounted motion capture camera system.

A side view of an embodiment of a head-mounted motion capture camera system 500 is shown in FIG. 5. Approximately 75 makeup dots 560 will be placed on the face of the actor. The makeup dots are not reflective and so are not captured by the fixed motion capture cameras described above (e.g. 100 in FIG. 1). Additionally, unlike the reflective markers used for tracking the body movements, the makeup dots are simple paint that can remain in place for an entire day, without needing to be replaced or repositioned. Cameras 540 are positioned on mounting rods 520. In a preferred embodiment, the camera system 500 has two mounting rods 520 and each mounting rod has two cameras 540 and the cameras 540 are machine vision micro-cameras. The cameras 540 record grayscale images of the actor's face, which are then used to track the movement of the face during post-processing.

The placement of the four cameras around the face allow for stereo reconstruction from both sides of the face because each side of the face is imaged from two different angles. In addition, the cameras move with the actor, keeping the relative position of each camera to the face the same, which minimizes the calculations necessary to identify and track the makeup dots 560 and to process the image data.

Figure 6:
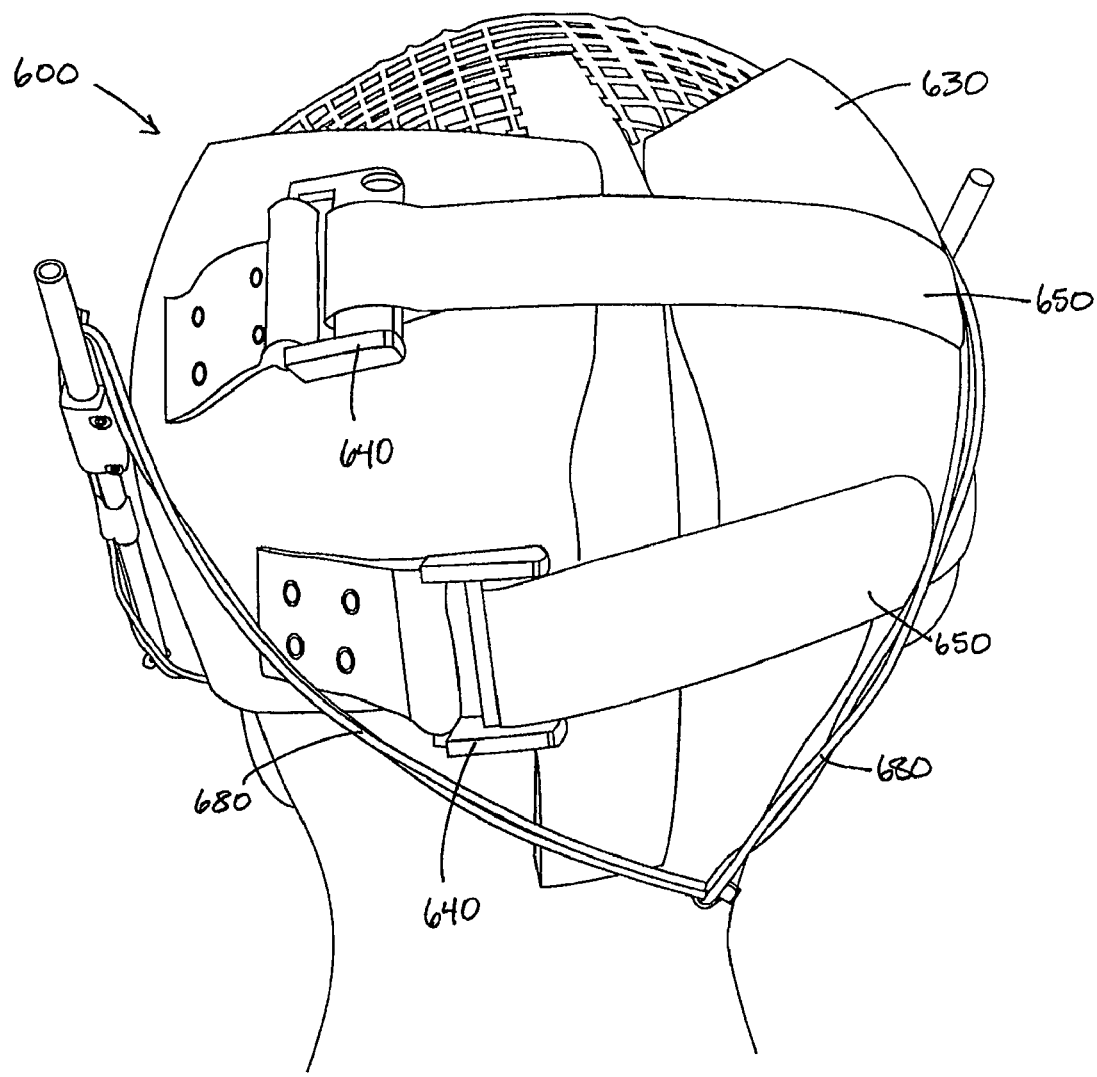
FIG. 6 shows a rear view of the head-mounted motion capture camera system.

FIG. 6 shows a view of the back of the head-mounted motion capture camera system 600. The helmet 630 may be secured to the head of the actor, for example by using buckles 640 with a hook-and-loop fastening material 650, a chin strap (not shown), or a pressurized custom fit. In a preferred embodiment, cables 680 are gathered at the back of the actor's head and then connected to the data logger (not shown) in order to minimize the chances of the actor becoming entangled by the cables or the cables becoming disconnected.

Figure 7A:
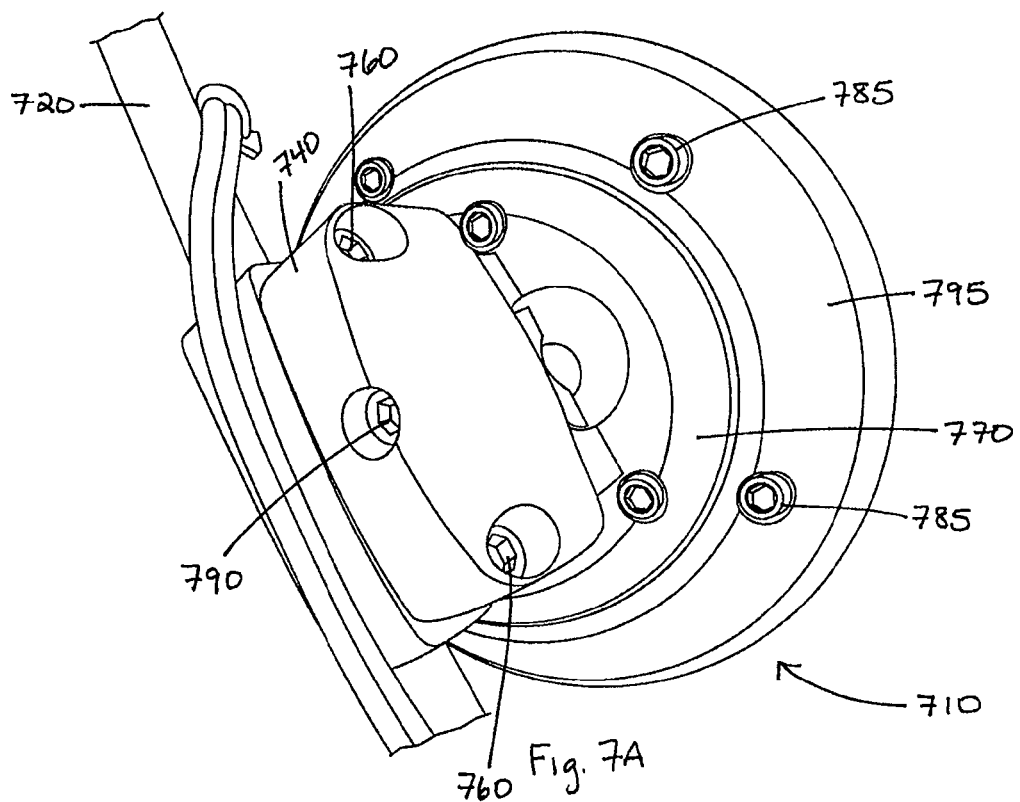
FIGS. 7A and 7B show enlarged views of a universal joint.
Figure 7B:
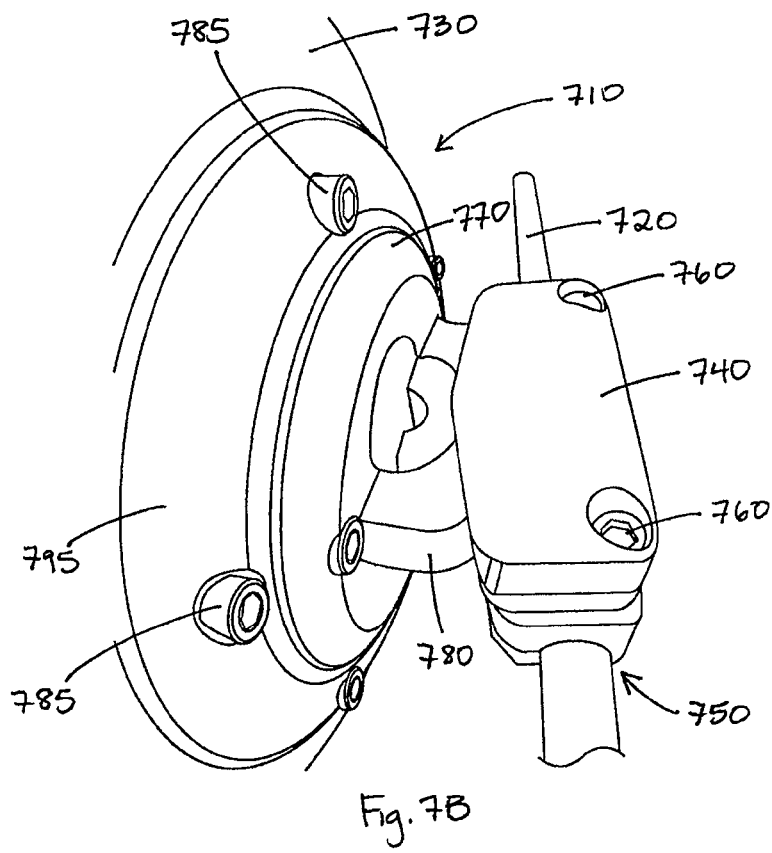
Figure 8A:
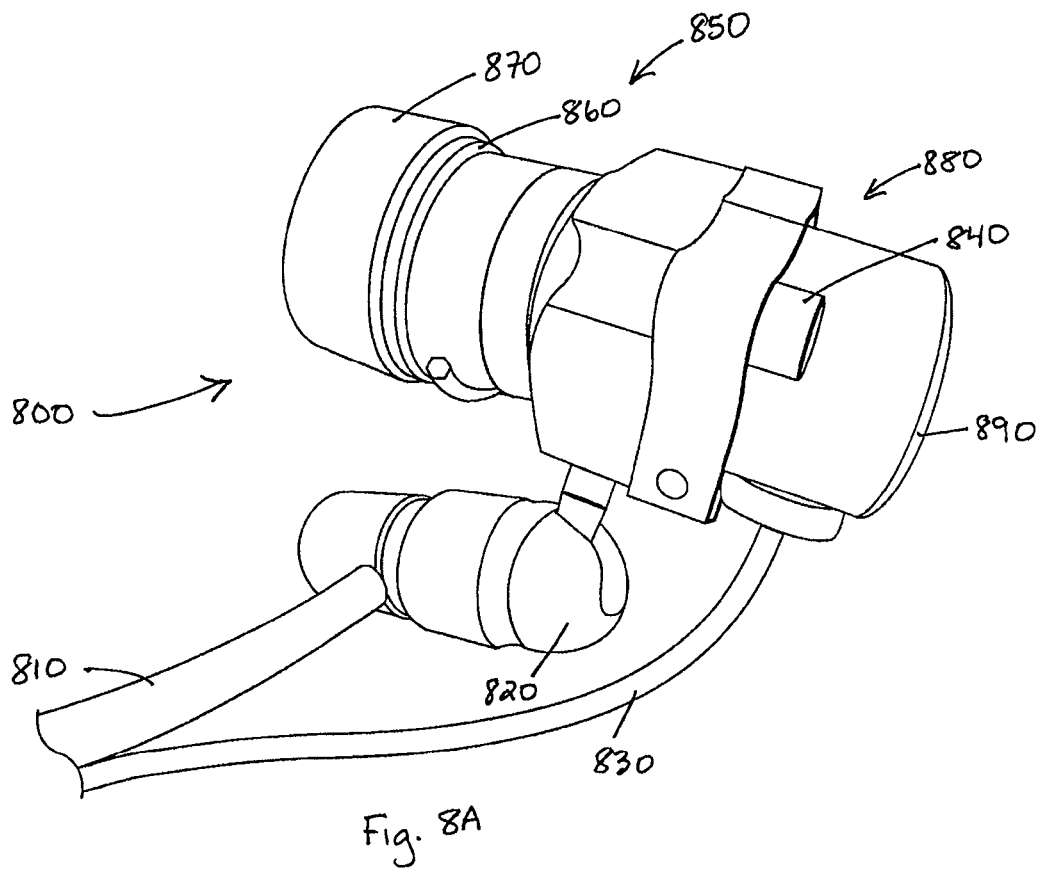
FIGS. 8A-8D show enlarged views of a camera and universally pivoting ball joint according to an embodiment of the invention.
Figure 8B:
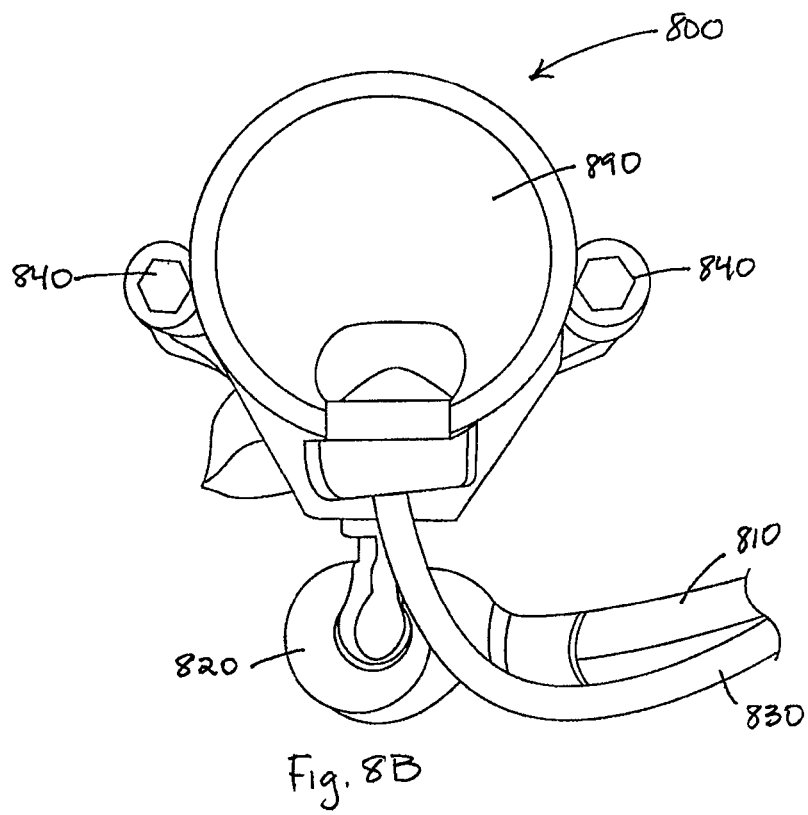
Figure 8C:
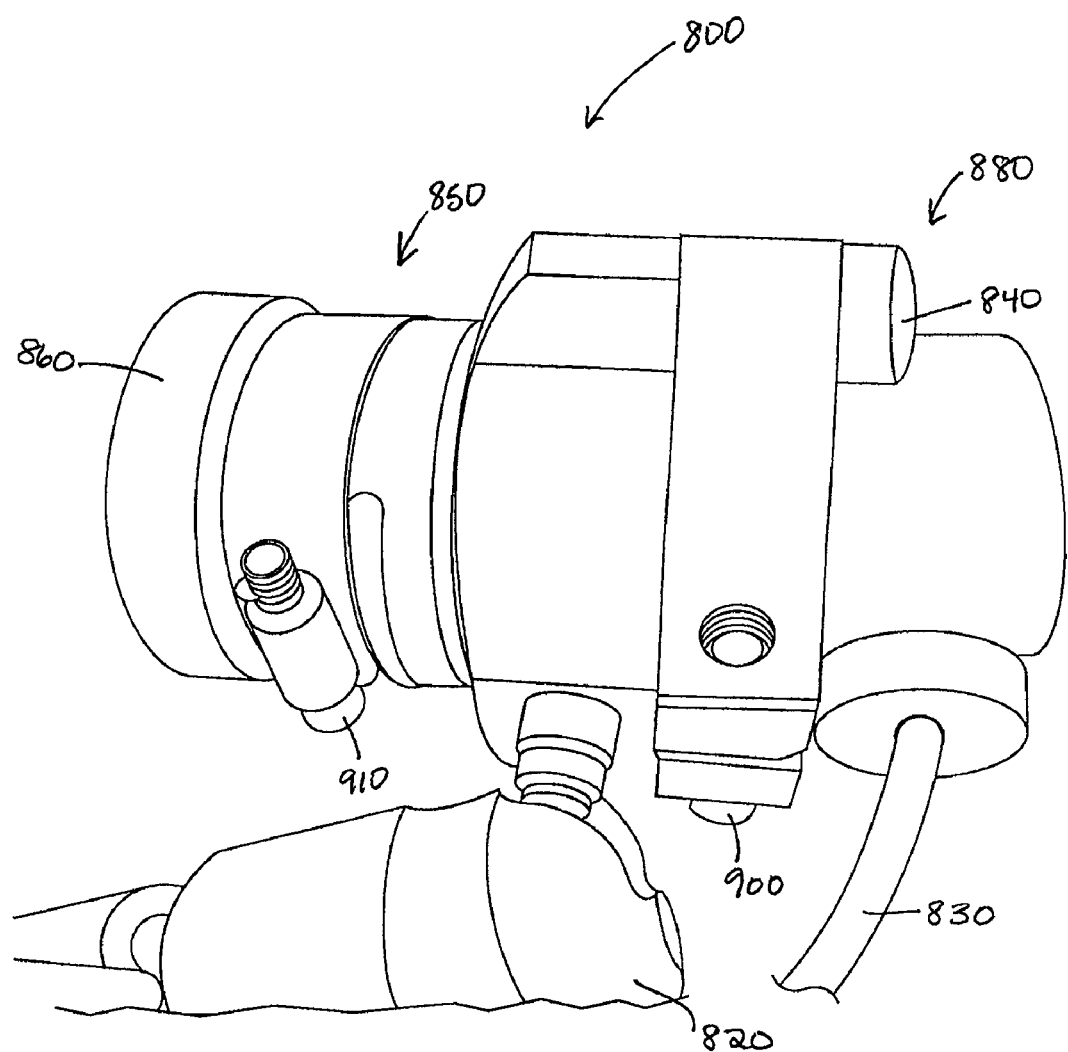
Figure 8D:
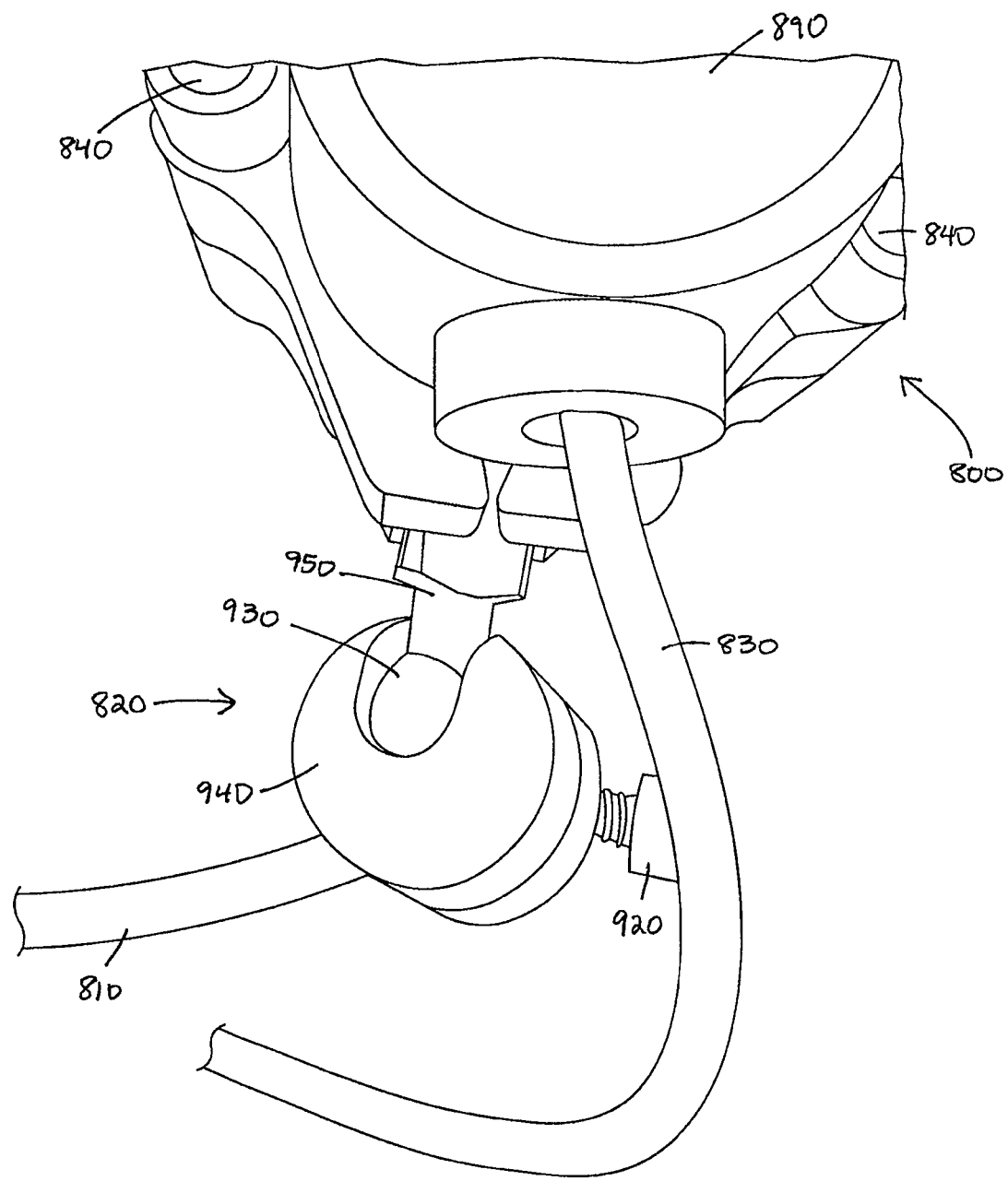

FIGS. 7A and 7B show additional views of an embodiment of the universal joint 710 that connects the mounting rod 720 to the helmet 730. Bracket 740 holds the mounting rod 720 in a channel 750 that runs through the length of the bracket. By loosening set screws 760, mounting rod 720 may be rotated around its axis and may be repositioned within the channel 750 to extend a greater or shorter distance from the bracket 740. The bracket 740 is attached to the inner circular portion 770 with connector 780, and the bracket may pivot on the connector to adjust the mounting rod 720 to be closer to or further from the actor's face. A set screw 790 is used to secure the bracket 740 in position with the connector 780.

The universal joint 710 provides a connection for the mounting rod that is both easily repositioned by simply loosening the appropriate set screws, and securely held in a fixed position when the set screws are tightened. When necessary, one of the mounting rods 720 may be removed from the helmet 730 by loosening screws 785 to remove the entire assembly from the helmet. This can be useful in scenes where an actor is required to hold an object near one side of his face, for example, or when he is required to rest his head on a surface, such as a pillow. After that portion of the performance has been captured, the mounting rod 720 and universal joint 710 assembly can be replaced in exactly the same position and orientation as it was previously arranged by reattaching the set screws 785. Because the outer circular portion 795 does not move with respect to the helmet 730, as discussed above, when it is placed on the helmet again with the screws, it will adopt its original orientation.

In FIGS. 8A-8D, enlarged views of a camera and universally pivoting ball joint according to an embodiment of the invention are shown. Camera 800 is attached to mounting rod 810 via a universally pivoting ball joint 820. The universally pivoting ball joint 820 comprises a ball 930 that fits inside a socket 940, which allows the camera to be oriented in a wide range of directions. The ball 930 of the ball joint 820 is connected via a stem 950 to the housing of the camera 800, while the socket 940 is connected to the mounting rod 810. Once an orientation is selected for the camera, based on the requirements of the actor's face or other considerations, the ball 930 may be locked into that position in the socket 940 using set screw 920.

Set screws 900 hold the camera 800 in place on the stem 950 of the universally pivoting ball joint 820. The camera 800 may be removed, for example to replace a defective or non-functioning camera, by simply loosening the set screws 900. It is not necessary to adjust the ball joint 820 or the mounting rod 810 to remove the camera, thus when a camera 800 (either the same or a different camera) is placed onto the ball joint 820, it will be in the same position and orientation as the original camera. Similarly, set screws 910 hold the lens 860 in place and allow it to be removed and replaced without changing its position or orientation.

This consistency, along with the consistent positioning of the mounting rod as discussed above, is exceptionally helpful in minimizing the computational requirements for processing the image data. Processing can be performed using techniques described in co-pending U.S. patent application Ser. No. 12/240,655, filed Sep. 29, 2008, entitled "Methods and apparatus for dot marker matching"). The tolerance for maintaining the positions of each of the elements is to within portions of a millimeter. It is important to maintain the position and orientation of the cameras and mounting rods in order to keep the angle of view of the face from each camera the same, as well as to keep the angles between each of the cameras constant. Because the cameras remain in a known, fixed position, even after a replacement, it is easier to identify and correlate the makeup dots on the actor's face, and thus to process the images for the animation. Further, because the cameras are fixed relative to the face, they have a much higher effective resolution, yielding a better signal to noise ratio.

Also in FIGS. 8A-8D, cable 830 is shown connecting the camera 800 to the data logger (not shown). A front portion 850 of the camera 800 comprises a lens 860, which may be covered by a lens cap 870 for protection when not in use. Screws 840 secure the front portion 850 to the rear portion 880 of camera 800. In some embodiments, the camera 800 comprises a charge-coupled device ("CCD") element. The CCD element (not shown) is permanently secured within the rear portion 880 by a resin 890.

Advantages of the present invention include both the data processing aspects and the performance aspects of motion capture technology. The head-mounted camera system of the present invention captures images that show much greater detail about the movement of the face, which provides a greater effective resolution of the face for use in creating the final animation product. This greater detail is achieved in part because the cameras are able to maintain a close view of the face at all times, even when an actor's face would otherwise be blocked from view if using only the fixed cameras. The greater detail is also due in part to the larger number of markers that may be captured using the head-mounted camera system, versus the number that can be captured with previous systems.

In addition, because the head-mounted camera system captures the facial image data at the same time as the body capture, the system has the artistic advantages of prior simultaneous capture solutions while using manageable data capture and processing requirements. For example, an actor need not attempt to duplicate his performance precisely for separate captures of the face and the body. In addition, the placement of the cameras at the sides of the face allow for a less obstructed line of sight for the actor, which is preferred by actors and contributes to their comfort in performing using motion capture equipment. The placement also allows unobstructed access to the actor's mouth, which is helpful, for example, in scenes where the actor is expected to eat or drink.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. A mounting bracket for a head-mounted motion capture camera system for capturing motion of an actor's face comprising:
    a helmet adapted to be positioned on the head of an actor; and
    at least one mounting rod coupled to the helmet with a universal joint;
    wherein each mounting rod has at least one camera mounted thereon;
    wherein the universal joint comprises:
        an inner circular portion disposed concentrically inside an outer circular portion, wherein the inner circular portion is rotatable with respect to the outer circular portion; and
        a connector attached to the inner circular portion, the connector configured to allow the mounting rod to pivot with respect to the helmet;

wherein the outer circular portion is configured to be fixed in a position to maintain a fixed orientation of the mounting rod with respect to the helmet and is removable such that universal joint can be removed and replaced while maintaining the fixed orientation of the mounting rod with respect to the helmet.

2. The mounting bracket of claim 1, wherein the at least one mounting rod has at least three degrees of freedom of movement.

3. The mounting bracket of claim 1, wherein the helmet has a front and a back and wherein the at least one mounting rod is configured to extend toward the front of the helmet.

4. The mounting bracket of claim 1, wherein the at least one camera is attached to the mounting rod with a universally pivoting ball joint.

5. The mounting bracket of claim 4, wherein the universally pivoting ball joint is adapted to be fixed in position such that the angle of the camera with respect to the mounting rod does not change.

6. The mounting bracket of claim 5, wherein the universally pivoting ball joint is configured such that the camera may be removed and replaced at the same angle with respect to the mounting rod.

7. The mounting bracket of claim 1, wherein the at least one camera is configured to capture images of the actor's face.

8. The mounting bracket of claim 7, wherein the at least one camera comprises at least two cameras and wherein the cameras are configured to capture images of the actor's face from at least two angles.

9. The mounting bracket of claim 1, wherein the mounting bracket comprises two mounting rods attached to the helmet.

10. The mounting bracket of claim 9, wherein the two mounting rods are attached on opposite sides of the helmet 11. The mounting bracket of claim 9, wherein each mounting rod has two cameras mounted on the rod.

12. A mounting bracket for a head-mounted camera system comprising:
   a helmet adapted to be positioned on the head of an actor;
   two mounting rods attached to either side of the helmet, wherein the mounting rods are connected to the helmet by a universal joint; and
   a plurality of cameras positioned on the mounting rods;
   wherein the universal joint comprises:
      an inner circular portion disposed concentrically inside an outer circular portion, wherein the inner circular portion is rotatable with respect to the outer circular portion; and
      a connector attached to the inner circular portion, the connector configured to allow the mounting rod to pivot with respect to the helmet;
   wherein the outer circular portion is configured to be fixed in a position to maintain a fixed orientation of the mounting rod with respect to the helmet and is removable such that universal joint can be removed and replaced while maintaining the fixed orientation of the mounting rod with respect to the helmet.

13. The mounting bracket of claim 12, wherein the plurality of cameras comprises at least one camera positioned on each mounting rod.

14. The mounting bracket of claim 12, wherein the plurality of cameras are attached to the mounting rods with universally pivoting ball joints.

* * * * *